United States Patent
Chang

(10) Patent No.: US 6,857,588 B1
(45) Date of Patent: Feb. 22, 2005

(54) SPINNING REEL HAVING COVER FOR DECORATION

(75) Inventor: Liang-Jen Chang, Taiping (TW)

(73) Assignee: Okuma Fishing Tackle Co., Ltd., Taiping (TW)

( * ) Notice: Subject to any disclaimer, the term of this patent is extended or adjusted under 35 U.S.C. 154(b) by 0 days.

(21) Appl. No.: 10/692,739

(22) Filed: Oct. 27, 2003

(51) Int. Cl.[7] ............................................. A01K 89/01
(52) U.S. Cl. ...................... 242/311; 242/310; 242/312
(58) Field of Search ................................ 242/310, 311, 242/312; D22/140, 141

(56) References Cited

U.S. PATENT DOCUMENTS

| | | | | |
|---|---|---|---|---|
| 3,877,658 A | * | 4/1975 | Lemery | 242/236 |
| 5,540,397 A | * | 7/1996 | Yoshikawa | 242/311 |
| D388,497 S | * | 12/1997 | Iwabuchi | D22/141 |
| 6,138,935 A | * | 10/2000 | Zwayer et al. | 242/311 |
| D460,516 S | * | 7/2002 | Yoshikawa et al. | D22/141 |
| D467,299 S | * | 12/2002 | Kondo et al. | D22/141 |
| 6,572,043 B1 | * | 6/2003 | Burke et al. | 242/244 |
| 6,629,655 B2 | * | 10/2003 | Kitajima | 242/311 |
| D487,496 S | * | 3/2004 | Iwabuchi | D22/141 |
| 2002/0056776 A1 | * | 5/2002 | Sugawara | 242/231 |
| 2003/0146325 A1 | * | 8/2003 | Kitajima | 242/311 |

FOREIGN PATENT DOCUMENTS

| | | |
|---|---|---|
| DE | 100 24 066 | 4/2001 |
| EP | 0 750 841 | 1/1997 |
| EP | 1 332 672 | 8/2003 |

* cited by examiner

*Primary Examiner*—Eileen D. Lillis
*Assistant Examiner*—Evan Langdon
(74) *Attorney, Agent, or Firm*—Browdy and Neimark, P.L.L.C.

(57) ABSTRACT

A spinning reel includes a reel body having a connection portion for connecting said reel body to a fishing rod, and an engagement portion. A handle is rotatably mounted on the reel body. A rotor has a hole fitted onto the engagement portion of the reel body to mask the engagement portion. A spool is rotatably mounted on the reel body for a fishing line wound thereon. A cover is mounted on the reel body to mask a portion of the reel body on which heads of bolts are exposed. The cover has two arms each of which have a distal end coupled to the engagement portion.

16 Claims, 5 Drawing Sheets

SPINNING REEL HAVING COVER FOR DECORATION

BACKGROUND OF THE INVENTION

1. Field of the Invention

The present invention relates generally to a fishing tool, and more particularly to a spinning reel, which has a cover mounted thereon for decoration and for masking the exposed bolts.

2. Description of the Related Art

A conventional spinning reel has a reel body, a drive mechanism mounted inside the reel body, a handle to drive the drive mechanism working, a rotor rotatably mounted on the reel body and driven by the drive mechanism for rotation, and a spool reciprocally mounted on the reel body and driven by the drive mechanism for reciprocation. The drive mechanism is fixedly mounted in the reel body by bolts and the reel body consists of two cases coupled with each other by bolts too, so that the spinning reel has many heads of the bolts exposed outside. The conventional spinning reel was provided with a cover mounted on the reel body for masking the exposed heads of the bolts. However, the cover is mounted on the reel body by bolts too, so that there are still heads of bolts exposed.

SUMMARY OF THE INVENTION

The primary objective of the present invention is to provide a spinning reel having a cover, which has a smooth surface and without bolt exposed.

According to the objective of the present invention, a spinning reel comprises a reel body having a connection portion for connecting said reel body to a fishing rod, and an engagement portion. A handle is rotatably mounted on the reel body. A rotor has a hole fitted onto the engagement portion of the reel body to mask the engagement portion. A spool is rotatably mounted on the reel body for a fishing line wound thereon. A cover is mounted on the reel body to mask a portion of the reel body. The cover has two arms each of which have a distal end coupled to the engagement portion.

DETAILED DESCRIPTION OF THE INVENTION

Figure 1:
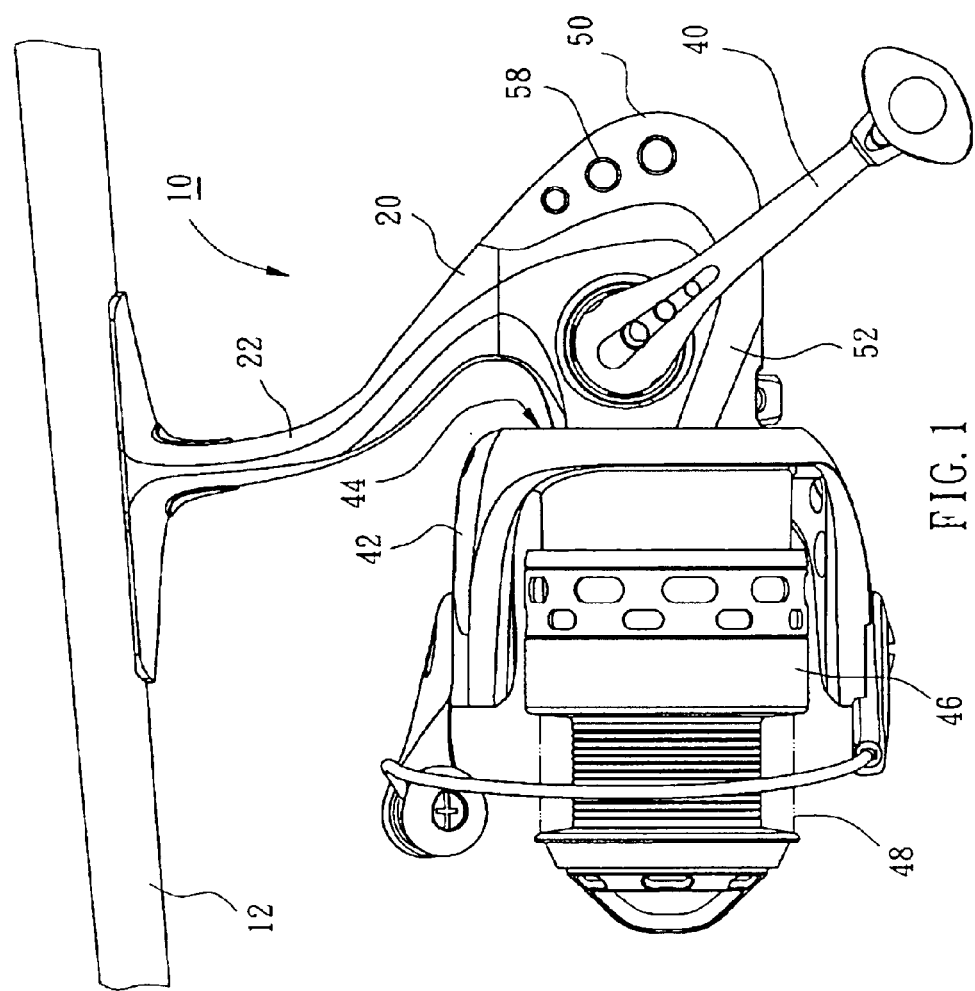
FIG. 1 is a front view of a first preferred embodiment of the present invention.
Figure 2:
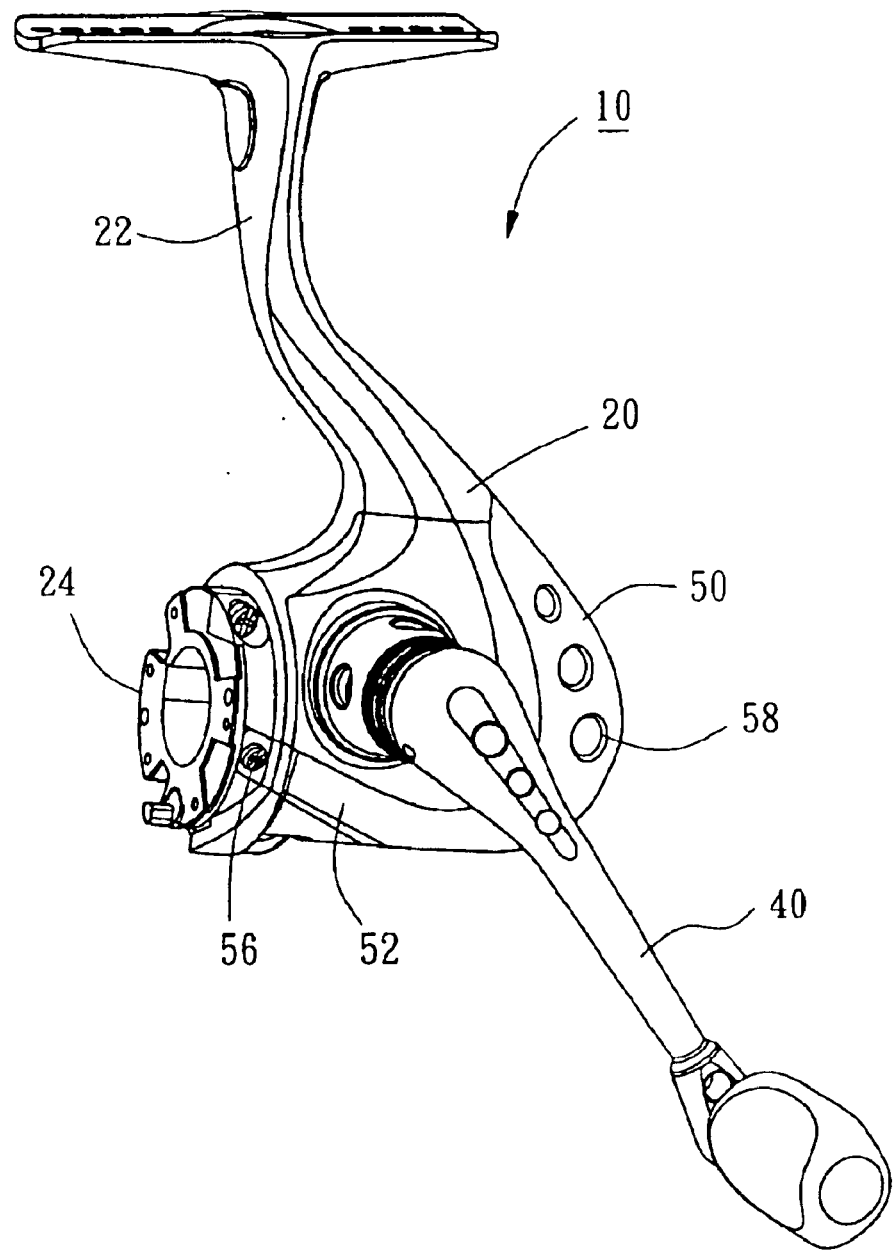
FIG. 2 is a perspective view in part of the first preferred embodiment of the present invention.
Figure 3:
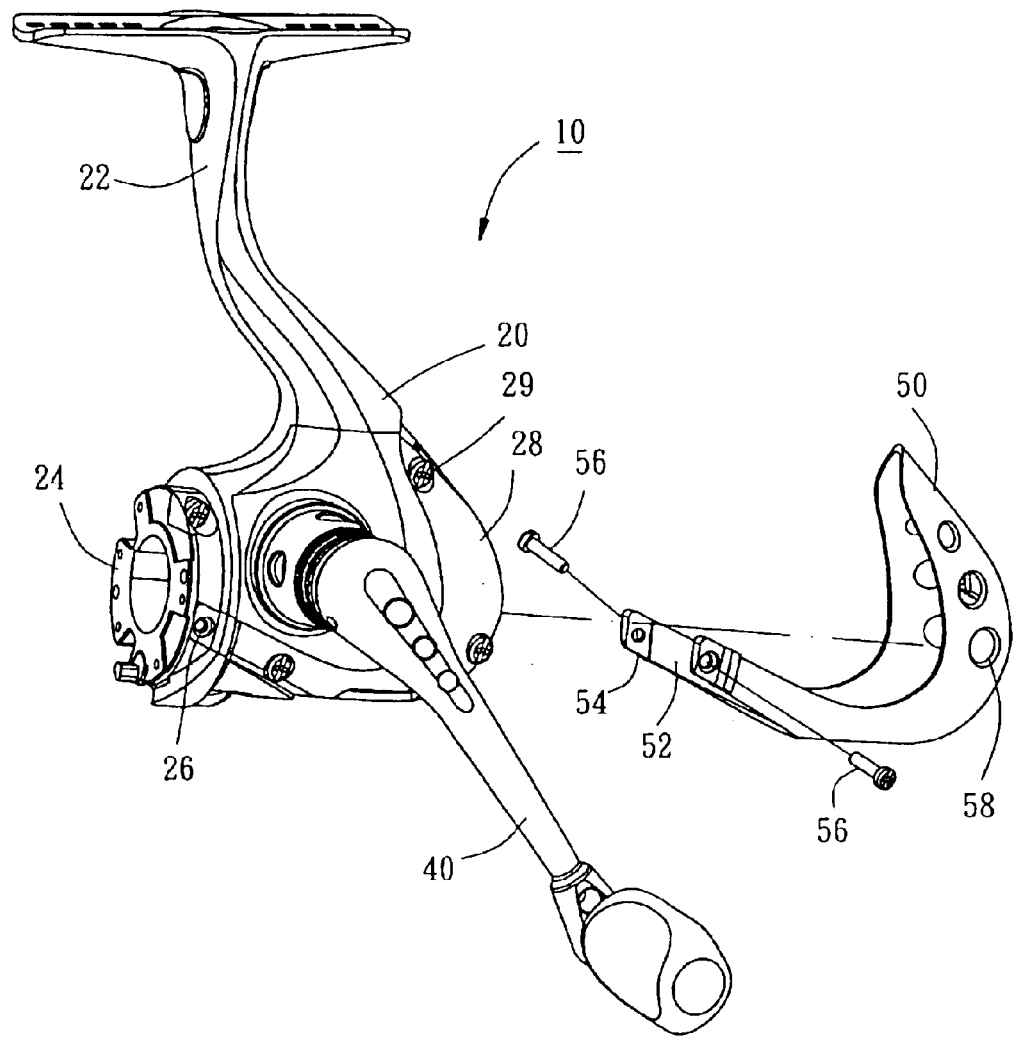
FIG. 3 is an exploded view of FIG. 2.

As shown in FIGS. 1–3, a spinning reel 10 of the first preferred embodiment of the present invention mainly comprises a reel body 20, a handle 40 rotatably mounted on the reel body 20, a rotor 42 provided on the reel body 20 to be driven by the handle 40 for rotation, a spool 46 provided on the reel body 20 to be driven by the handle 40 for reciprocation, and a cover 50.

The reel body 20 has a connection portion 22, an engagement portion 24 and a lowland portion 28. The connection portion 22 is a T-shaped post to be coupled with a fishing rod 12. The lowland portion 28 is arranged at a rear of the reel body 20 and has a shape that is complementary to the cover 50. The engagement portion 24 is a short column at a front of the reel body 20 having two thread holes 26 on a periphery thereof. Bolts 29 are screwed on the lowland portion 28 to fix a drive mechanism (not shown) and the other parts of the spinning reel 10 in the reel body 20.

The handle 40 is rotatably mounted on the reel body 20 to drive the drive mechanism working. The rotor 42 has a hole 44 to be coupled with the engagement portion 24 of the reel body 20 such that the engagement portion 24 is masked by the rotor 42. The rotor 42 is driven by the drive mechanism for rotation. The spool 46 is provided on the reel body 20 for a fishing line 48 wound thereon. The spool 46 is driven by the drive mechanism for reciprocation.

The cover 50 covers the lowland portion 28 of the reel body 20, and the surface of the cover 50 is flush with the surface of the reel body. The cover 50 has two parallel arms 52 on each of which have an opening 54 adjacent to a distal end thereof. The arms 52 is arranged in between the engagement portion 24 and the rotor 42 and two bolts 56 are inserted into the openings 54 of the arms 52 and screwed into the thread holes 26 of the engagement portion 24.

After the cover 50 is mounted, it masks all of the exposed heads of the bolts 29 on the reel body 20 and the bolts 56 fixing the cover 50 over lowland portion 28 are masked by the rotor 42 so that no bolt on the surface of the spinning reel 10 is visible. The cover 50 is provided with various holes 50 for decoration.

Figure 4:
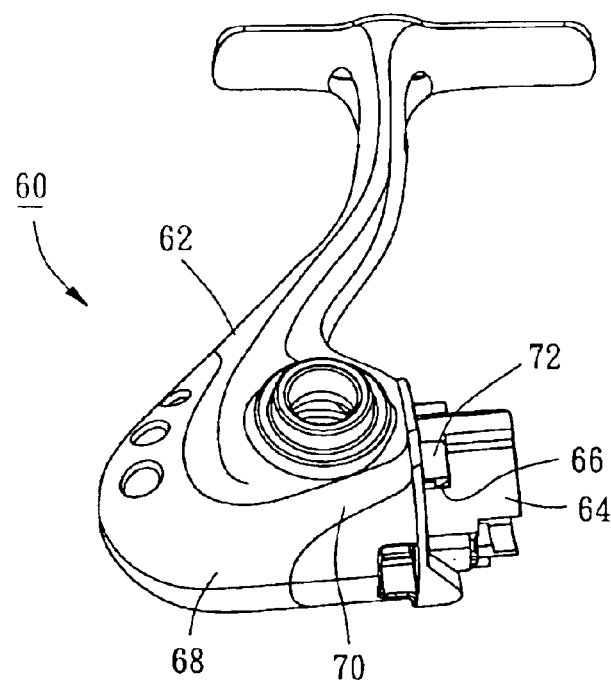
FIG. 4 is a front view in part of a second preferred embodiment of the present invention.
Figure 5:
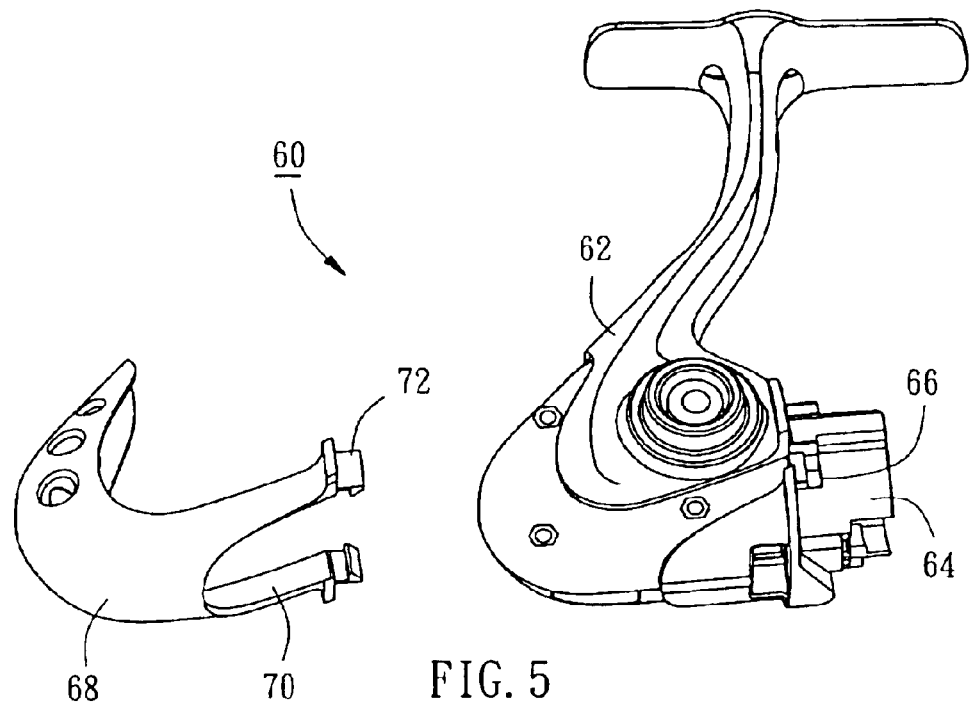
FIG. 5 is an exploded view of FIG. 4.

As shown in FIG. 4 and FIG. 5, the second preferred embodiment of the present invention provides a spinning reel 60 having a reel body 62 on which has an engagement portion 64 and two holes 66 on the engagement portion 64. A cover 68 has two arms 70 on each of which has a hooking portion 72. The cover 68 is mounted on the reel body 62 with the hooking portions 72 hooking the holes 66 and the hooking portions 72 of the cover 68 are masked by the rotor (not shown) as in the first preferred embodiment.

The primary inventive feature of the present invention is to provide the cover with a portion coupled with the engagement portion of the reel body and masked by the rotor.

Figure 6:
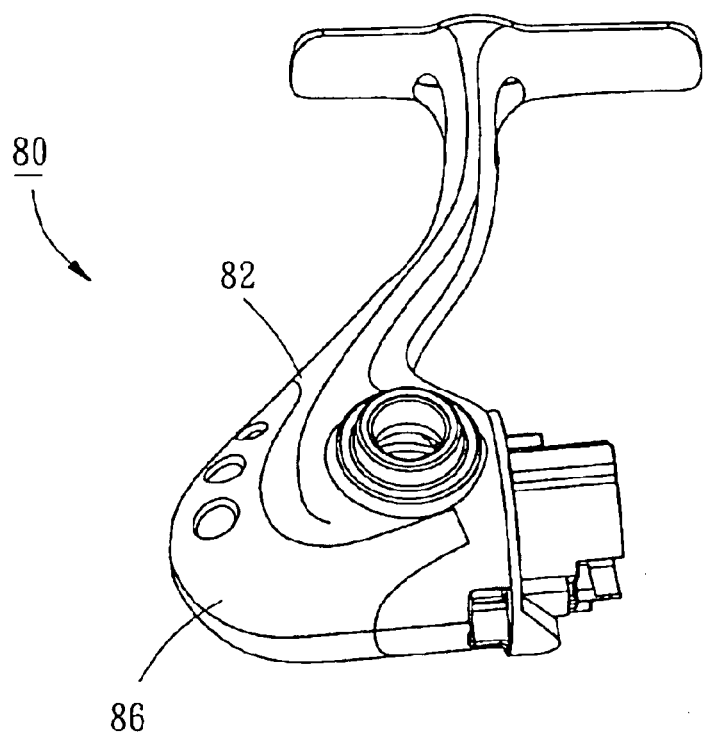
FIG. 6 is a front view in part of a third preferred embodiment of the present invention.
Figure 7:
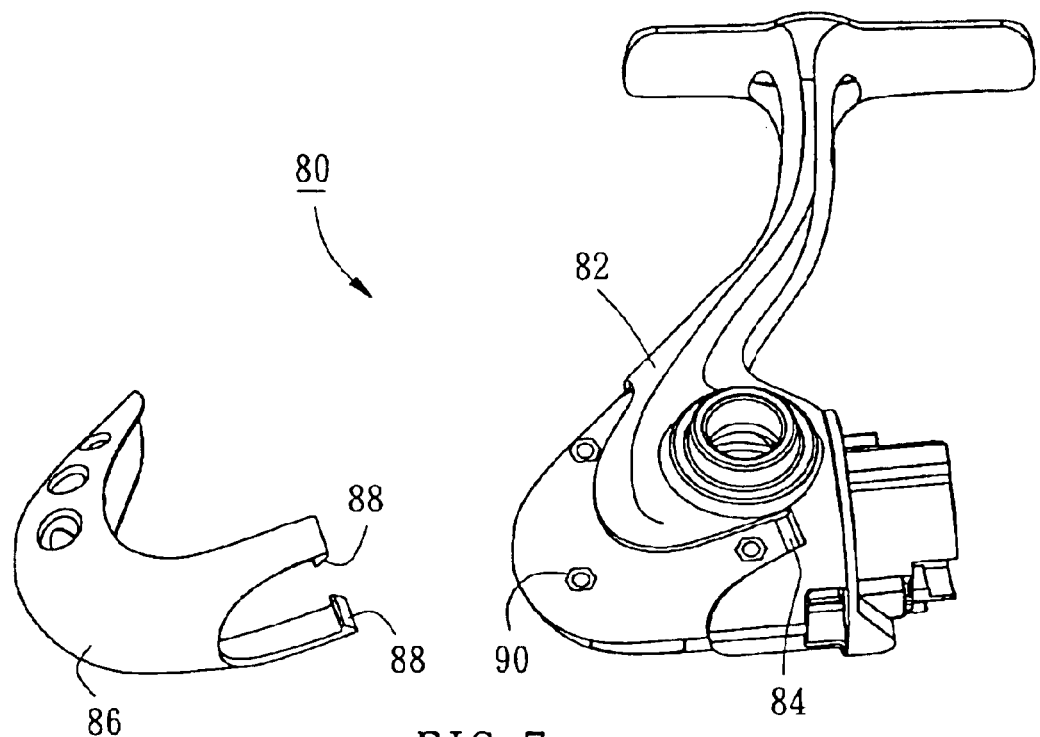
FIG. 7 is an exploded view of FIG. 6.

FIG. 6 and FIG. 7 show a spinning reel 80 of the third preferred embodiment of the present invention. The spinning reel 80 has a reel body 82 provided two holes 84, and a cover 86 having two hooking portions 88 on two arms thereof. The cover 86 is mounted on the reel body 82 with the hooking portions 88 engaging the holes 84. The cover masks the bolts mounted on the reel body.

What is claimed is:

1. A spinning reel, comprising:

a reel body having a connection portion for connecting said reel body to a fishing rod, and an engagement portion;

a handle rotatably mounted on the reel body;

a rotor having a hole fitted onto the engagement portion of the reel body to mask the engagement portion;

a spool rotatably mounted on the reel body for a fishing line wound thereon, and a cover mounted on the reel body to mask a portion of the reel body, said cover having two arms each of which have a distal end fixed to the engagement portion below the inner surface of the rotor.

2. The spinning reel as defined in claim 1, wherein the cover has an opening on each of the distal ends of the arms and the reel body has two thread holes on the engagement portion and below the inner surface of the rotor, wherein two bolts are inserted into the openings of the arms and screwed into the thread holes of the engagement portion respectively.

3. The spinning reel as defined in claim 1, wherein the cover has a hooking portion on each of the distal ends of the arms and the reel body has two holes on the engagement portion and below the inner surface of the rotor, wherein the hooking portions are engaged with the holes of the engagement portion respectively.

4. The spinning reel as defined in claim 1, wherein the reel body has a lowland portion on which the cover is mounted.

5. The spinning reel as defined in claim 1, wherein the cover has openings thereon.

6. A spinning reel, comprising:
    a reel body having a connection portion for connecting said reel body to a fishing rod, an engagement portion, and two holes;
    a handle rotatably mounted on the reel body;
    a rotor having a hole fitted onto the engagement portion of the reel body to mask the engagement portion;
    a spool rotatably mounted on the reel body for a fishing line wound thereon,
    a cover mounted on the reel body to mask a lowland portion of the reel body, said cover having two arms each of which have a distal end forming a hooking portion to be engaged with the holes of the reel body respectively, and
    wherein the surface of the cover is flush with the surface of the reel body.

7. The spinning reel as defined in claim 6, wherein the cover has openings thereon.

8. A spinning reel, comprising:
    a reel body having a connection portion for connecting said reel body to a fishing rod, and an engagement portion;
    a handle rotatably mounted on the reel body;
    a rotor having a hole fitted onto the engagement portion of the reel body to mask the engagement portion;
    a spool rotatably mounted on the reel body for a fishing line wound thereon, and
    a cover mounted on the reel body to mask a portion of the reel body, said cover having two arms each of which have a distal end coupled to the engagement portion,
    wherein the cover has an opening on each of the distal ends of the arms and the reel body has two thread holes on the engagement portion, wherein two bolts are inserted into the openings of the arms and screwed into the thread holes of the engagement portion respectively.

9. The spinning reel as defined in claim 8, wherein the reel body has a lowland portion on which the cover is mounted.

10. The spinning reel as defined in claim 9, wherein the surface of the cover is flush with the surface of the reel body.

11. The spinning reel as defined in claim 10, wherein the cover has openings thereon.

12. A spinning reel, comprising:
    a reel body having a connection portion for connecting said reel body to a fishing rod, and an engagement portion;
    a handle rotatably mounted on the reel body;
    a rotor having a hole fitted onto the engagement portion of the reel body to mask the engagement portion;
    a spool rotatably mounted on the reel body for a fishing line wound thereon, and
    a cover mounted on the reel body to mask a portion of the reel body, said cover having two arms each of which have a distal end coupled to the engagement portion,
    wherein the cover has a hooking portion on each of the distal ends of the arms and the reel body has two holes on the engagement portion, wherein the hooking portions are engaged with the holes of the engagement portion respectively.

13. The spinning reel as defined in claim 11, wherein the reel body has a lowland portion on which the cover is mounted.

14. The spinning reel as defined in claim 13, wherein the surface of the cover is flush with the surface of the reel body.

15. The spinning reel as defined in claim 14, wherein the cover has openings thereon.

16. The spinning reel as defined in claim 4, wherein the surface of the cover is flush with the surface of the reel body.

* * * * *